June 30, 1931

May 2, 1933.

R. H. MAPLE

THERMOSTATIC CIRCUIT BREAKER

Original Filed Sept. 25, 1922

Re. 18,816

3 Sheets-Sheet 1

INVENTOR.

ROY H. MAPLE.

BY

Lockwood & Lockwood

ATTORNEYS.

R. H. MAPLE

May 2, 1933. THERMOSTATIC CIRCUIT BREAKER Re. 18,816

Original Filed Sept. 25, 1922 3 Sheets-Sheet 2

INVENTOR.
ROY H. MAPLE.

BY
Lockwood & Lockwood
ATTORNEYS.

R. H. MAPLE

May 2, 1933. THERMOSTATIC CIRCUIT BREAKER Re. 18,816

Original Filed Sept. 25, 1922 3 Sheets-Sheet 3

INVENTOR.
ROY H. MAPLE.

BY
Lockwood & Lockwood
ATTORNEYS.

Reissued May 2, 1933 Re. 18,816

UNITED STATES PATENT OFFICE

ROY H. MAPLE, OF INDIANAPOLIS, INDIANA, ASSIGNOR, BY MESNE ASSIGNMENTS, TO I-T-E CIRCUIT BREAKER CO., A CORPORATION OF NEW JERSEY

THERMOSTATIC CIRCUIT BREAKER

Original application filed September 25, 1922, Serial No. 590,237. Renewed November 10, 1930. Original No. 1,812,162, dated June 30, 1931. Application for reissue filed October 24, 1932. Serial No. 639,349.

This invention relates to improvements in circuit breakers.

The chief object of this invention is to provide a circuit breaker which is of low capacity so that the same is adapted to replace the present fuse construction.

Another object of the invention, and probably the most important, consists in constructing the device in such a manner that the usual line switch associated with the fuse is replaced by a combination thermally controlled switch, which is positively protective in its action in that as long as the load is on the line the circuit cannot be permanently closed.

Another object of the invention is to construct the device in such a manner that the elements thereof are not releasable when subjected to excessive vibration.

A further object of the invention is to construct the same in such a manner that the device may be enclosed to prevent any excess whatsoever to the mechanism, unless the complete switch mechanism is entirely removed from the circuit by prior removal from its support.

Figure 1:
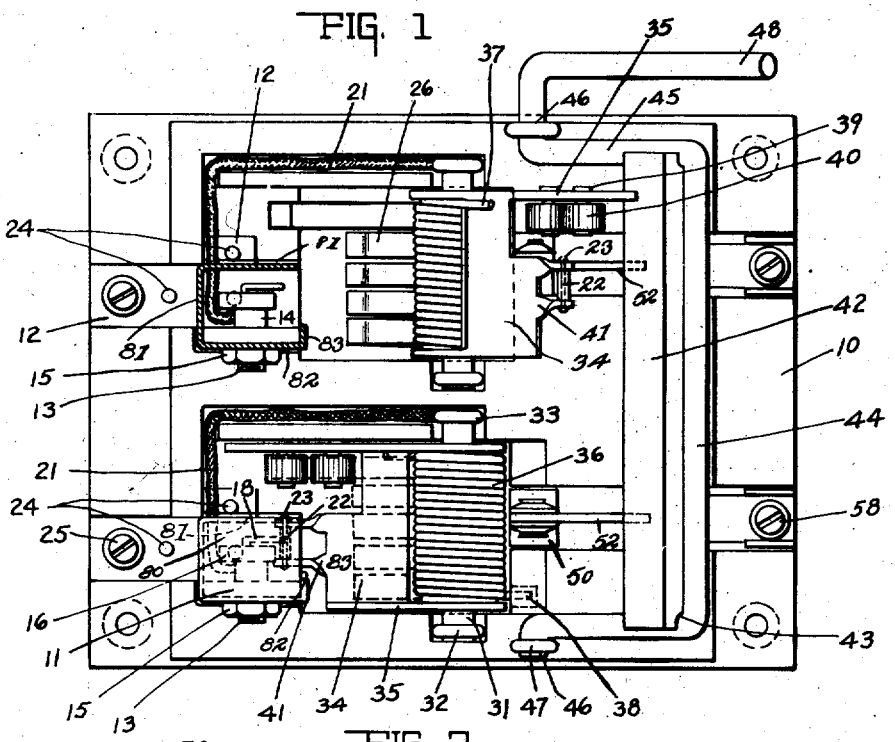
Figure 2:
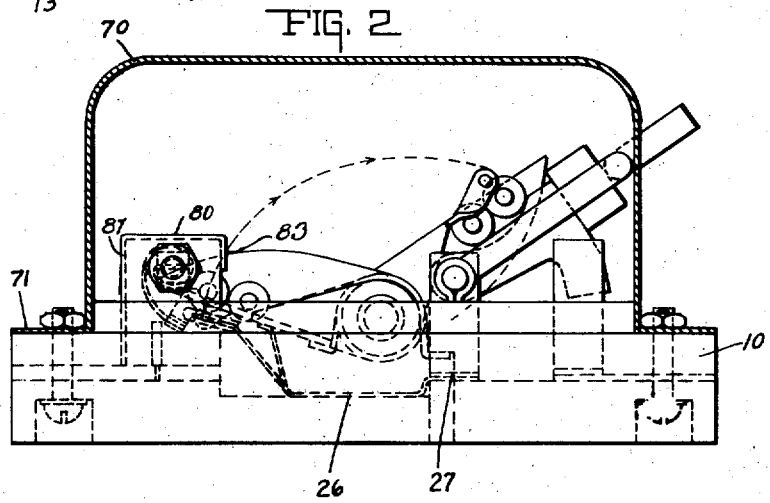
Figure 3:
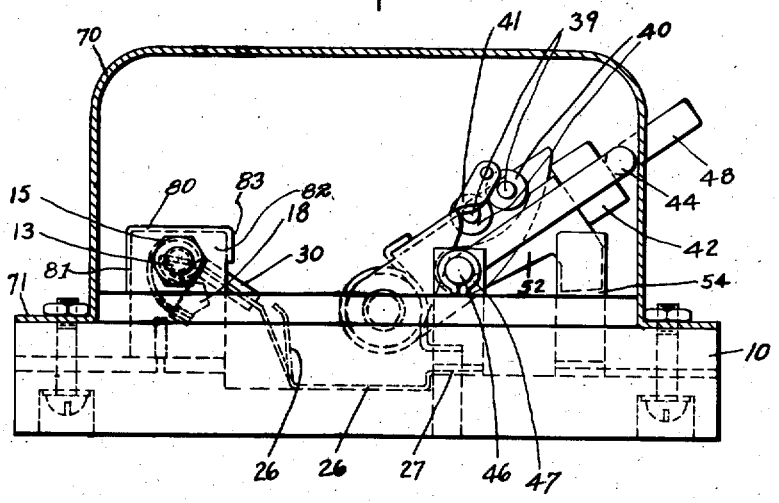
Figure 4:
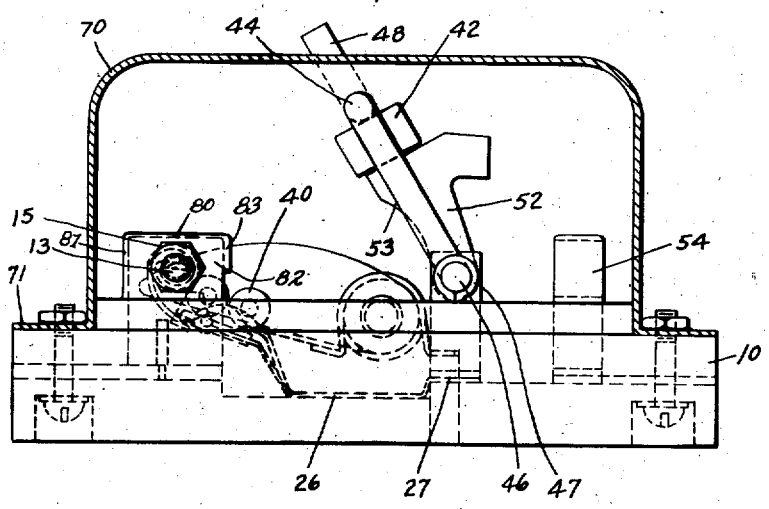
Figure 5:
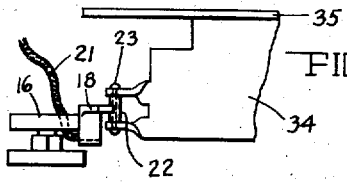
Figure 9:
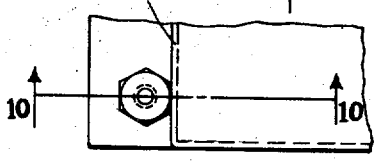
Figure 6:
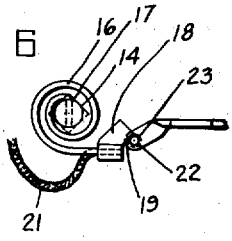
Figure 7:
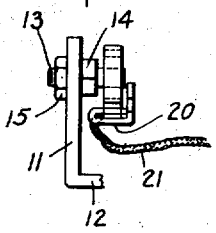
Figure 10:
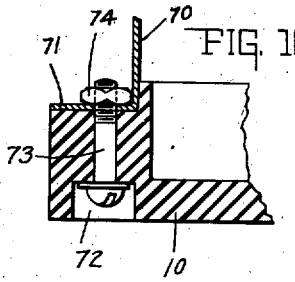
Figure 8:
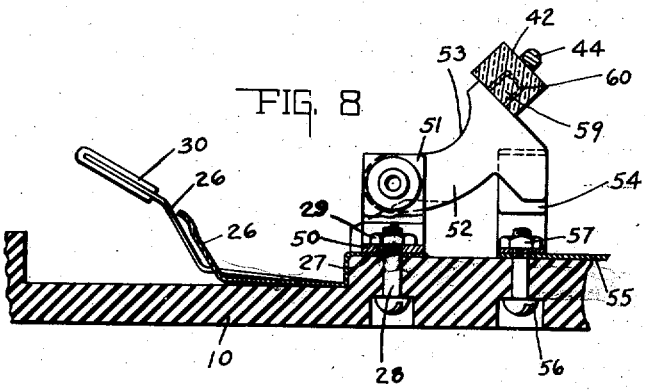
Figure 11:
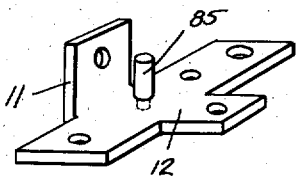
Figure 12:
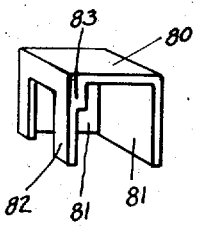

The full nature of this invention will be understood from the accompanying drawings and the following description and claims:

In the drawings, Fig. 1 is a top plan view of the invention showing the same as a two pole switch construction with one switch construction in the closed circuit position and the other in the open circuit position. Fig. 2 is a cross sectional view. Fig. 3 is a similar view showing the thermally controlled parts in the open circuit position and the manually controlled parts in the closed position. Fig. 4 is a similar view showing the thermally controlled parts in the closed circuit position and the manually controlled parts in the open circuit position. Fig. 5 is a top plan view of the thermal member and the catch and latch associated therewith. Fig. 6 is a side elevational view of the same. Fig. 7 is an end elevational view of the same. Fig. 8 is a cross sectional view showing the details of mounting a portion of the switch mechanism. Fig. 9 is a top plan view of a portion of the cover and supporting base showing the means for securing the same together. Fig. 10 is a central sectional view taken on the line 10—10 of Fig. 9 and shows the same construction. Fig. 11 is a perspective view of the thermostat support and the travel limit means. Fig. 12 is a perspective view of the thermostat protective cover.

In the drawings 10 indicates an insulating base provided in the present instance with a pair of thermally controlled devices, and a pair of switches associated therewith, the switches and the thermally controlled device being manually operable by a common member, in a manner hereinafter to be described. While a plurality of similar units are herein illustrated, the invention is not to be limited to a plurality, but may be constructed of a single thermally controlled device and a single switch or a plurality of each.

Since the thermally controlled devices are substantially identical, a description of one will suffice for them both. A standard 11 having the base portion 12 suitably supports the stud 13 which is adjustably positioned in said standard by means of a tool engageable portion 14 and the lock nut 15. The portion 14 permits the stud to be engaged by a suitable tool and said stud may be turned in the bracket into the desired position to secure a predetermined amount of movement upon the passage of a predetermined current through the thermally responsive element herein shown in the form of a thermostat 16, which is coiled and has its inner end 17 secured in the slotted end of the stud 13, see Figs. 5, 6 and 7. When stud 13 is adjusted it is permanently secured as by soldering. The other end of the thermostat is provided with a catch portion 18 having the retaining edge 19 and the supporting portion 20. The supporting portion 20 is not only secured to the front end of the coil thermostat, but also secures one end of a shunt or pig tail member 21. The particular angular position and form of the edge 19, when associated with a roller 22 carried by the pin 23, is such that said catch retains said roller in the latched position even under extreme vibratory conditions and the passage of current through the thermostat of slightly less value than the normal operative current of the thermostat. In operation the passage of current through the thermal member 16 extends said thermal member and the retaining member 18 is withdrawn rearwardly or rather outwardly from the roller 22 and the movement is also such that the member 18 is moved downwardly as well. The roller rests upon the edge 19 until it is free from the retaining member 18 and, thereafter is released and moved upwardly with a support associated with the pin 23 and hereinafter to be described.

The base 12 supporting the standard 11, is suitably secured to the insulated base 10 at at least three points indicated by the numerals 24. This three point support insures absolute rigidity of the standard 11, whereby exactness and certainty of operation is secured. The base 12 is extended, as shown clearly in Fig. 1 and carries a terminal 25, whereby current carrying means is secured to said base. This terminal 25 is connected to the load side of the circuit.

The particular switch construction controlled by the thermal construction comprises a plurality of spring contact fingers 26 suitably secured, as shown in Fig. 2, to the base 10 at 27 and by the bolt and nut means 28 and 29 respectively. One of the spring fingers 26 carries an arc resisting protective member 30. The spring finger contacts 26 are connected to the live side of the line of the circuit.

Upon the particular pivot 31 suitably secured to the base 10 by means of the cotter pins 32 and 33 is a U-shaped plate 34 having the side portions 35 which are apertured to receive the pivot 31. Between the ears or sides 35 of the plate 34 and concentric with the pivot, is a coil spring 36, which has one end 37 bearing upon said side member 34 and the other end 38 suitably secured to or bearing upon the base 10 so that said coil spring normally tends to maintain the plate member 34 in the open circuit position. The side wall 35 of the plate member 34 pivotally supports at 39 a contact roller 40. Herein a pair of said rollers is illustrated in tandem, but it is to be understood that if desired a roller may be associated with each of the side walls 35, or the number of rollers may be increased or diminished or other contact arc resisting means substituted therefor. The roller 40 engages the arc resisting contact member 30 and contacts the arc when the switch is open or closed. The plate 34 is provided with two forwardly extending arms 41 which are twisted and drilled to form a pair of bearings for the pin 23 carrying the roller 22. When the plate member 34 is caused to close the circuit by means of the roller 40 engaging the contact 30, current is transmitted from said plate member 34 to the plate 12 by means of the pig tail or shunt construction 21, which is electrically connected with the plate 34. By reason of the coil construction the thermostat moves outwardly to permit the roller 22 to pass and be latched thereby.

Suitable means for manually closing the thermally controlled switch comprises an insulating block 42 each end of which is grooved at 43 to be secured to a U-shaped handle 44 having the arms 45 which are provided with trunions 46 pivotally supported by the cotter pins 47. One trunnion 46 is extended and forms a handle 48 whereby the insulating member may be moved into engagement with the plate 34 for closing the thermally controlled switch. The side walls 35 of the plate 34 engage the insulating member 42 as shown clearly in Fig. 2 and as shown in Fig. 4, said insulating member 42 is adapted to move the plate 34 into closed circuit position.

Reference will now be had to Figs. 1 to 4, inclusive, and Fig. 8. In said figures a U-shaped current conducting member 50 is simultaneously secured to the base 10 with the spring finger 26 and is in electrical connection therewith. The U-shaped member 50 is provided with two inwardly extending parallel ends which pivotally support a switch plate 52. The switch plate 52 is herein shown cut away at 53 to form an arcuate edge for clearing coil spring 36 when latching the thermal switch member. Positioned in alignment with the switch plate 52, is a spring contact of any usual or preferred form 54, which is suitably secured to a contact strip 55 by means of the bolt and nut 56 and 57 respectively, thereby maintaining said switch contact and the contact strip 55 upon the insulating base 10. The contact strip 55 terminates in a terminal 58 substantially similar to the terminal 25 and said terminal 58 is adapted to be connected to the current supply line and, therefore, the live side of the line. The contact switch plate 52 is provided with a projecting portion 59 and the insulating member 42 is provided with an opening 60 adapted to receive the projecting portion 59.

From the foregoing it will be observed that the insulating member 42 is rigidly secured in position by means of the U-shaped handle 44 and the contact plate or plates 52. It will also be noted that in order to close the thermally controlled switch it is necessary to open the circuit between the switch plate 52 and the contact 54, and after said switch has been closed in order to supply current to the circuit, the handle 44 must be moved into the opposite direction, as shown in Figs. 2 and 8, and close the circuit through the switch plate 52 and contact 54. If the abnormal circuit conditions persist, current will again pass through the thermostat and release the switch controlled thereby and thereby prevent the passage of current to the load. Thus, the load will be protected at all times. In order to close the thermally controlled switch, after the second operation thereof, it is again necessary to open the main line switch including the plate 52 and contact 54 and thereby open the whole circuit in order to close the thermally controlled switch. So long as the abnormal condition exists in the load circuit it is impossible to supply current to the load circuit without having the thermally controlled switch operate.

With the foregoing construction it will be realized that the device is absolutely fool-proof so far as a single line is concerned and the device is adapted to replace the fuse and switch construction now employed as standard wiring members. It will, of course, be understood that the capacity of the switch is determined by the kind and amount of material and the construction of the thermostat. All of the current passes through the thermostat, although, if desired, the thermostat may be shunted and a portion of the current pass through the shunt.

In the drawings there is illustrated a double switch construction which may be utilized in direct current wiring or single phase alternating current wiring system. The generic idea of the invention as shown herein, which may be briefly stated as non-closing, load in the line switch, may be extended to multiple phase alternating current system without departing therefrom, but such an extension cooperative arrangement between the phases forms no part of the present invention, but is reserved for subsequent application.

A further feature of the invention is to make the same fool-proof, in that it is always desirable to prevent tampering or unauthorized interference with the switch construction. A cover 70 is provided which is suitably apertured to permit the handle 48 to extend through said cover and the cover 70 is provided with a flange portion 71 and, as shown clearly in Figs. 2, 3, 4 and 10, the base 10 is apertured at 72 and in said aperture there is secured a bolt 73 which is associated with the nut 74 which is provided with a flat face, said face engaging upon the side of the cover 70. The nut thus is held against rotation by the cover. Likewise the cover, when secured to the base 10 by means of the bolt 73, cannot be removed from said base without first removing the base 10 from its support. Under the underwriters' present wiring requirements, a grounded cabinet must be provided and said grounded cabinet is so constructed that the line wire and the load wire must be disconnected from the switch construction supported by the base 10 before said base can be removed from said cabinet. The removal of the cover 70 from the base 10, to permit access to be had to the switch construction, necessitates the removal of base 10 from its support to get at bolt 73. Only a competent electrician will follow the foregoing inconvenient procedure, and this is what the device is intended to insure, as well as automatically protect the load circuit.

In order to fully protect the catch, thermostat and the mounting thereof, a cap is provided, said cap comprises a top portion 80, a pair of adjacent depending walls 81 and an apertured side wall 82 with a retaining portion 83. Said cap construction is adapted to substantially enclose the thermostat member 16 and yet permit the latch to be associated with the catch portion. The nut 15 secures the cap 80 to the stud 13, and preferably is soldered to the standard 11 when said stud 13 and nut 15 are soldered thereto, thereby forming a rigid joint.

To prevent excessive movement of the thermostat, thus permanently deforming the same, a stop member 85, see Fig. 11, is provided which is suitably secured to the plate 12 and limits movement as indicated in Figs. 1 to 4, inclusive.

The invention claimed is:

1. An electric switch construction including in combination a plurality of thermally operable switches, each having a current conducting and movable switch controlling member, a plurality of manually operable switches each in series with one of the other switches, and a single common means differentially associated with both types of switches at the same time.

2. In an electric switch construction the combination of a plurality of manually controlled switches, a plurality of thermally controlled switches each having a current conducting and movable switch controlling member and being each in series with one of the other switches, and a single common means associated with all of said switches for closing the same.

3. In an electric switch construction the combination of a plurality of manually controlled switches, a plurality of thermally controlled switches each having a current conducting and movable switch controlling member and being each in series with one of the other switches, and a manually operable single means simultaneously associated with all the thermally operable switches for closing the same or all the manually operable switches for closing the same.

4. An electric switch construction including in combination a thermostatically controlled switch having a current conducting and movable switch controlling member, a manually operable switch in series therewith, and means associated with both switches but at different times for closing the same.

5. An electric switch construction including in combination a plurality of thermostatically controlled switches each having a current conducting and movable switch controlling member, a plurality of manually operable switches, each in series with one of the other switches, and a single common means differentially associated with both types of switches at the same time.

6. In an electric switch construction the combination of a plurality of manually controlled switches, a plurality of thermostatically controlled switches each having a current conducting and movable switch controlling member and being each in series with one of the other switches, and a single common means associated with all of said switches for closing the same.

7. In an electric switch construction the combination of a plurality of manually controlled switches, a plurality of thermostatically controlled switches each having a current conducting and movable switch controlling member and being each in series with one of the other switches, and a manually operable single means simultaneously associated with all the thermostatically controlled switches for closing the same or all the manually operable switches for closing the same.

8. In a thermally controlled switch the combination of an enclosing casing, a thermally expansible member, means for limiting the expansion movement of said thermally expansible member, and a protective cap for said thermally expansible member.

9. In a thermally controlled switch the combination of an enclosing casing, a thermally expansible member, a supporting member therefor, means for limiting the expansion movement of said thermally expansible member and supported by said supporting member, and a protective cap for said thermally expansible member also supported by said supporting member.

10. In a thermally controlled switch the combination of a current conducting and movable thermally expansible switch controlling member, a switch member controlled by said thermally expansible member, a second switch member positioned adjacent the first mentioned switch member, and a roller means carried by said first mentioned member for engaging said second mentioned switch member.

11. In a thermally controlled switch the combination of a current conducting and movable thermally expansible switch controlling member, a switch member controlled by said thermally expansible member, a second switch member positioned adjacent the first mentioned switch member, a roller means carried by said first mentioned member for engaging said second mentioned switch member, and arc resisting material upon said second mentioned switch member for the purpose described.

12. In a thermally controlled switch the combination of a current conducting and movable thermally expansible switch controlling member, a switch member controlled by said thermally expansible member, a second switch member positioned adjacent the first mentioned switch member, and a plurality of rollers carried by said first mentioned member for successively engaging said second mentioned switch member.

13. In an enclosed switch the combination of a casing, a support, a switch thermostat, and a housing therefor including a pair of adjacent sides, a top and an apertured side for the reception of a thermostat support.

14. In an enclosed switch the combination of a casing, a support, a switch thermostat, and a housing therefor including a pair of adjacent sides, a top and an apertured side for the reception of a thermostat support, and a retaining portion associated with the top and one of the sides positioned as a fourth side.

15. In a thermally controlled switch the combination of a current conducting and movable thermally actuated control member, a catch controlled thereby, a pivotally supported plate provided with a pair of projecting portions in spaced relation, a pivot pin supported by said projecting portions, and a roller supported by said pin in the space between said portions and engageable by said catch.

16. In a switch construction the combination of a pivotally supported switch member, an insulating member extending transversely of said switch member, a U-shaped rod pivotally supported and adapted to straddle said insulating transverse member, and a pin and slot connection between said switch member and said insulating transverse member, whereby the latter is rigidly secured between said switch member and said second mentioned transverse member.

17. In a switch construction the combination of a plurality of pivotally supported switch members, an insulating member extending transversely of said switch members, a U-shaped rod pivotally supported and adapted to straddle said insulating transverse member, and a pin and slot connection between each of said switch members and said insulating transverse member, whereby the latter is rigidly secured between said switch member and the U-shaped rod and the switch members are simultaneously movable.

18. An electric switch construction including a plurailty of thermally releasable switches, each including a current conducting and movable switch controlling member, a plurality of other switches, each other switch being in series with one of said thermally releasable switches, and a common closing means for successively and simultaneously closing different types and each type of switches respectively.

19. In a thermal switch, the combination of a contact member biased to open circuit position, a latch normally retaining said member in closed circuit position, a thermal element having an electric current passing therethrough for effecting release of said latch upon occurrence of predetermined circuit conditions, and said thermal element being adjustable to vary said predetermined conditions, and a protective cap permanently secured over said thermal element to prevent tampering with the same when once adjusted.

20. In a thermal switch, the combination of contact members biased to open circuit position, a latch normally retaining said members in closed circuit position, a thermal element having an electric current passing therethrough, said element normally retaining said latch in circuit closing position but releasing the same to permit movement of said contact members to open circuit position when predetermined current conditions exist in said thermal element, adjusting means for varying said predetermined conditions, and a protective cap permanently secured over said adjusting means to prevent tampering therewith when once adjusted.

21. In a thermal switch, the combination of contact members relatively movable to open and closed circuit positions, a thermal element having an electric current passing therethrough, said element normally retaining said contact members in closed circuit position but releasing the same to open circuit position when predetermined current conditions exist in said thermal element, said thermal element being adjustable to vary said predetermined conditions, and a protective cap permanently secured over said thermal element to prevent tampering with the same when once adjusted.

22. In a thermal switch, the combination of contact members relatively movable to open and closed circuit positions, means releasably restraining said contacts in closed circuit positions, a thermal element having an electric current passing therethrough for effecting release of said means upon occurrence of predetermined circuit conditions, adjusting means for varying said predetermined conditions, and a protective cap permanently secured over said adjusting means to prevent tampering therewith when once adjusted.

23. In a thermal switch, the combination of contact members relatively movable to open and closed circuit positions, a thermal element having an electric current passing therethrough, said element normally retaining said contact members in closed circuit position but releasing the same to open circuit position when predetermined current conditions exist in said thermal element, and a protective cap permanently secured over said thermal element to prevent tampering therewith.

24. In a thermal switch, the combination of contact members, latch means normally retaining the same in closed circuit position, a thermal element having an electric current passing therethrough, said element normally retaining said latch in circuit closing position but releasing the same to permit movement of said contact members to open circuit position when predetermined current conditions exist in said thermal element, a movable mounting for said thermal element movable to vary said predetermined current condition, and means for locking said mounting in adjusted position.

25. In a thermal switch, the combination of contact members, latch means normally retaining the same in closed circuit position, a thermal element having an electric current passing therethrough, said element normally retaining said latch in circuit closing position but releasing the same to permit movement of said contact members to open circuit position when predetermined current conditions exist in said thermal element, a stud on which one end of said thermal element is mounted, a support in which said stud is rotatably mounted, movement of said stud serving to adjust the position of said thermal element for varying said predetermined current condition, and means for locking said stud on said support.

26. In a thermal switch, the combination of contact members relatively movable to open and closed circuit positions, a thermal element having an electric current passing therethrough, said element normally retaining said contact members in closed circuit position but releasing the same to open circuit position when predetermined current conditions exist in said thermal element, and a protective cap secured over said thermal element in position to limit the movement thereof within the elastic limit of said element.

27. A circuit controlling device, incapable of restraint in circuit closing position during abnormal circuit conditions, comprising pivoted structure adapted to be restrained, spring means for biasing said structure to open-circuit position, a thermally-actuated member for releasably restraining said spring means, a manually operable member oscillatable to effect circuit rupture and closure and having a movement to effect restraint of said spring, and a subsequent movement effecting circuit closure, and means affording lost motion connection between said structure and said manually operable member to allow movement of said structure upon release of said spring.

28. A circuit controlling device, incapable of restraint in circuit closing position during abnormal circuit conditions, comprising structure adapted to be restrained, a thermally responsive bi-metallic releasing member therefor, a pivoted manually operable member movable in one direction to effect restraint of said structure, movable in reverse direction to effect circuit closure, and operable to effect circuit-rupture independently of release by said bi-metallic member, and means affording lost motion connection between said structure and said manually operable member to allow movement of said structure upon release thereof.

29. A circuit controlling device, incapable of restraint in circuit closing position during abnormal circuit conditions, comprising a base member, structure mounted thereon adapted to be restrained, a thermally responsive bi-metallic member for restraining said structure mounted upon said base, a membe positively manually operable in different directions pivotally mounted on said base, in one direction to effect restraining engagement between said structure and said bi-metallic member, and in reverse direction to effect circuit closure, and means affording lost motion connection between said structure and said manually operable member to allow circuit rupture upon release of said structure.

30. A circuit controlling device, incapable of restraint in circuit closing position during abnormal circuit conditions, comprising structure adapted to be restrained, thermally responsive means adapted to effect release of said structure, a pivoted member movable in one direction to effect restraint of said structure, in opposite direction to effect circuit closure, and subsequently in said first named direction to effect circuit rupture, and means affording lost motion connection between said structure and pivoted member to allow movement of said structure in response to release thereof.

31. A circuit controlling device, incapable of restraint in circuit closing position during abnormal circuit conditions, comprising a base, structure mounted thereon adapted to be restrained, a thermally responsive bimetallic member adapted to effect release of said structure, a cover for enclosing said structure and bi-metallic member, a pivoted member operable externally of said cover, movable in one direction to effect restraint of said structure, in opposite direction to effect circuit closure, and subsequently in said first named direction manually to open said circuit, and means within said cover affording lost motion connection between said structure and said pivoted member to allow movement of said structure in response to release thereof.

32. A circuit controlling device, incapable of restraint in circuit closed position during abnormal circuit conditions, comprising a base member, structure mounted thereon adapted to be latched, thermally responsive bi-metallic means for effecting unlatching of said structure under abnormal circuit conditions, an oscillatable member movable in one direction to effect latching of said structure, movable in reverse direction to effect circuit closure, and subsequently movable in said first named direction to effect circuit rupture without release of said structure, a cover preventing access to said restrainable structure and said bi-metallic member, means securing said cover in place, said oscillatable member operable from the exterior of said cover, and cabinet structure preventing unauthorized access to said cover-securing means.

33. A multipolar circuit controlling device comprising a plurality of independently movable structures and means individual thereto for restraining them in circuit closing position, a plurality of thermally responsive devices for effecting release of said structures individually, and manually operable means comprising means for effecting simultaneous circuit closure at such of the poles of said device as may be open and for effecting simultaneous circuit rupture at such of the poles of said device as may be in circuit closing position.

34. A multipolar circuit controlling device comprising a plurality of independently movable structures adapted to be restrained, a plurality of thermally responsive members for effecting release of said structures individually, housing structure for said device, and an oscillatable member manually operable externally of said housing structure, adapted by movement in one direction to effect restraint of all of said structures which are free, and movable in reverse direction to effect circuit closure at such of the poles of said device as may be open.

35. A multipolar circuit controlling device comprising a plurality of independently movable structures adapted to be restained, a plurality of thermally responsive members for effecting release of said structures individually, housing structure for said device, and an oscillatable member manually operable externally of said housing structure, adapted by movement in one direction to effect restraint of all of said structures which are free, movable in reverse direction to effect circuit closure at such of the poles of said device as may be open, and movable subsequently in said first named direction to effect circuit rupture at all poles.

36. Mechanism for controlling operation of switching apparatus comprising a plurality of thermal-responsive devices, a plurality of latching members individual to and releasably held by said thermal-responsive devices, and an operating member movable in one direction to effect relatching those of said latching members previously released, and movable in opposite direction to effect circuit closure and to permit said thermal devices individually to release their latching members.

37. In circuit-breaking mechanism incapable of restraint in circuit-closing position on overload, mechanism for controlling operation of movable contact structure of said circuit breaker comprising movable means, means for restraining the same in predetermined position, a plurality of thermal devices selectively operable to effect release of said movable means, spring means for effecting movement of said movable means upon release thereof, and a member movable to return said movable means for restraint in said predetermined position and for concurrently re-tensioning said spring means.

38. A circuit controlling device incapable of restraint in circuit closing position during abnormal circuit conditions, comprising a base, mechanism mounted thereon including structure adapted to be restrained, spring means for biasing said structure to open circuit position, and means for releasing said spring means including a thermally-actuated member responsive to abnormal circuit conditions, a member manually operable to actuate said mechanism to effect circuit rupture and closure, cover structure, for enclosing said mechanism while affording access to said manually operable member, secured to one side of said base, and means for securing said cover to said base inaccessible from said one side thereof.

39. A circuit breaker comprising a base, circuit breaker mechanism mounted thereon, a thermal-responsive device mounted on said base and effecting tripping of said mechanism upon occurrence of abnormal circuit conditions, a cover for enclosing said thermal device, means transmitting movement of said thermal device from within said cover to said circuit-breaker mechanism to effect tripping thereof, a second cover secured to and with said base forming a housing for said mechanism, and a member manually operable externally of said second cover to actuate said mechanism.

In witness whereof, I have hereunto affixed my signature.

ROY H. MAPLE.